United States Patent [19]

Lippacher et al.

[11] Patent Number: 4,967,888
[45] Date of Patent: Nov. 6, 1990

[54] SAFETY CLUTCH FOR MOTOR-OPERATED HAND TOOL

[75] Inventors: Wolfgang Lippacher, Herrsching; Martin Richter, Freising, both of Fed. Rep. of Germany

[73] Assignee: Hilti Aktiengesellschaft, Fürstentum, Liechtenstein

[21] Appl. No.: 371,450

[22] Filed: Jun. 27, 1989

[30] Foreign Application Priority Data

Jun. 27, 1988 [DE] Fed. Rep. of Germany ....... 3821594

[51] Int. Cl.⁵ .................. F16D 7/10; B25B 23/157
[52] U.S. Cl. .................. 192/56 R; 192/150; 464/35; 173/12; 81/474
[58] Field of Search .............. 192/56 R, 150, 38, 71, 192/72; 464/35; 173/12, 104; 81/474

[56] References Cited

U.S. PATENT DOCUMENTS 4,066,136 1/1978 Wanner et al. ............. 464/35 X
4,365,962 12/1982 Regelsberger ............. 192/56 R X
4,386,689 6/1983 Kato ............................ 192/56 R Primary Examiner—Richard Lorence
Attorney, Agent, or Firm—Toren, McGeady & Associates

[57] ABSTRACT

A safety clutch for a motor-driven hand tool breaks the rotational drive train when a working tool becomes seized in a receiving material. The safety clutch includes coupling members (25) positioned in a part (22) for transmitting rotational movement to the working tool. The coupling members (25) are radially displaceable within the part (22) between a first position rotatably connecting the part and a power take-off spindle (21) and a second position releasing the connection between the part and spindle. An annular inertial mass (28) rotates with and is rotatable relative to the part (22). The mass (28) has recesses (31) in its inner surface for receiving the coupling members (25) in the second position, and it has support surfaces for holding the coupling members (25) in connecting engagement in recesses (27) in the spindle in the first position.

8 Claims, 3 Drawing Sheets

SAFETY CLUTCH FOR MOTOR-OPERATED HAND TOOL

BACKGROUND OF THE INVENTION

The invention is directed to a safety clutch for a hand tool located in a drive train in the tool and including radially displaceable coupling members movable relative to a part in the drive chain connected to the drive motor and engageable with a power take-off spindle for transmitting rotational movement to the tool. The coupling members are displaceable by an actuating member into a position connecting the part with the power take-off spindle.

Hand tools, such as hand-held drills, screwdrivers and the like, require, for the protection of the user, a safety clutch for uncoupling the drive torque of the motor from a working tool which becomes seized in a receiving material in which the tool is working, so that the user can safely operate the hand tool.

A hand tool, as known from DE-AS 22 42 944, includes a safety clutch with balls as coupling members, with the balls being radially displaceable in a part on the drive side of the tool and being spring-loaded. When such a hand tool or drill becomes seized, the coupling members are forced out of drive recesses in the power take-off spindle, for driving a working tool such as a bit, against a spring force. As a result, the part on the drive side can rotate relative to the power take-off spindle.

In this known construction, the coupling members continue to be biased by the spring force after moving out of the recess in the power take-off spindle and remain biased against the spindle. The coupling members are supported in the part which continues to rotate mechanically and, consequently, move over the recesses of the stationary power take-off spindle in a continuous manner causing considerable residual torque which must be absorbed by the user. Such residual torque exerts high stresses on the user.

SUMMARY OF THE INVENTION

Therefore, it is the primary object of the present invention to provide a safety clutch for a motor-operated hand tool which eliminates any residual torque between the parts coupled together during normal working operation.

In accordance with the present invention, an actuating member, in the form of an inertial mass, is incorporated into the drive train, and is rotatable between two positions relative to the part on the drive side. The inertial mass has support surfaces and deflecting recesses spaced from one another so that in one rotational position, the support surfaces hold the coupling members in position connecting the part on the drive side with the power take-off spindle, and in the other rotational position, the deflecting recesses permit the coupling members to move radially into a position disengaging the part on the drive side from the spindle.

In the coupled condition of the one rotational position, the coupling members are held in drive recesses of the power take-off spindle by the support surfaces on the inertial mass. Accordingly, rotational movement is transmitted from the drive motor through the part on the drive side via the coupling members to the power take-off spindle and then from the spindle over intermediate members to a working tool clamped into a chuck on the hand-held tool. The inertial mass continues to rotate so that the engagement of the coupling members remains intact.

When the working tool, such as a drill bit, or the like, is brought to a stop, by becoming seized in the receiving material in which the tool is working, the part on the drive side is also stopped. The inertial mass, rotating along with the part on the drive side, moves from the one rotational position into the other due to its mass, and the deflecting recesses in the inertial mass move into alignment with the coupling members after the working tool has been stopped. The part on the drive side, under the influence of the driving torque of the drive motor, continues to rotate accompanied by the displacement of the coupling members from the drive recesses of the power take-off spindle into the deflecting recesses of the inertial mass. As a result, no perceptible drive torque is felt by the user. Moreover, the displacement of the coupling members is effected in such a brief period of time, that it is not noted by the user in any disturbing manner.

After the drive motor is stopped, and the working tool is released in the receiving material, the drive motor is restarted and the coupling members returned into the driving recesses in the spindle.

Preferably, the inertial mass overlaps or encloses the coupling members and has the support surfaces and the deflecting recesses located at an inner surface of the mass. As a result, the center of gravity of the inertial mass is displaced radially outwardly relative to its axis of rotation affording high inertia forces. This feature enhances the relative rotational movement of the inertial mass during any sudden stoppage of the working tool, and thus improves the uncoupling process.

The support surfaces in the inertial mass are located ahead of the deflecting recesses in the driving direction of rotation of the part on the drive side. Accordingly, this insures, during any sudden stoppage of the working tool, that the coupling members arrive in the range of the deflecting recesses of the inertial mass which continues to rotate in the driving direction of rotation and, as a consequence, the renewed coupling of the coupling members is effected during the rotation of the part on the drive side relative to the inertial mass in the driving direction of rotation. An entraining device for rotating the inertial mass relative to the part on the drive side in the rotational positions is preferably provided between the part on the drive side and the inertial mass. The entraining device can be formed by a pin mounted in the part on the drive side, with the pin engaging in a circumferentially extending groove in the inertial mass. The groove is limited in the circumferential direction. Accordingly, a positive-locking rotational driving of the inertial mass is obtained when the pin acts at a limiting end of the groove in the driving direction.

In an advantageous arrangement, the two rotational positions of the inertial mass relative to the part on the drive side is in the range of 20° to 60°. On one hand, this angular range insures a reliable holding function of the support surfaces adjoining the deflective recesses and on the other hand, insures a rapid uncoupling of the working tool when it becomes seized.

A spring, which propels the inertial mass into the rotational position, connecting the part on the drive side with the spindle via the coupling members is connected preferably to the inertial mass and to the part on the drive side. A spiral spring, with its end fixed to the inertial mass and to the part on the drive side, is suitable as the spring. The biasing action of the spring causes the inertial mass to rotate back automatically into the position holding the coupling members in the connected position as soon as the uncoupled coupling members have entered the driving recesses in the power take-off spindle when the drive motor is started. Preferably, the transition between the deflecting recesses and the support surfaces is formed as an abutting flank extending at an acute angle relative to the circumferential surface of the part on the drive side with the flank tapering inwardly in the driving direction of rotation. The abutting flank facilitates movement of the coupling members from the deflecting recesses during the start of the rotational movement of the part on the drive side.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 4a is a sectional view similar to FIG. 4, displaying another position of the drill, similar to that in FIG. 3a.

DETAILED DESCRIPTION OF THE INVENTION

Figure 1:
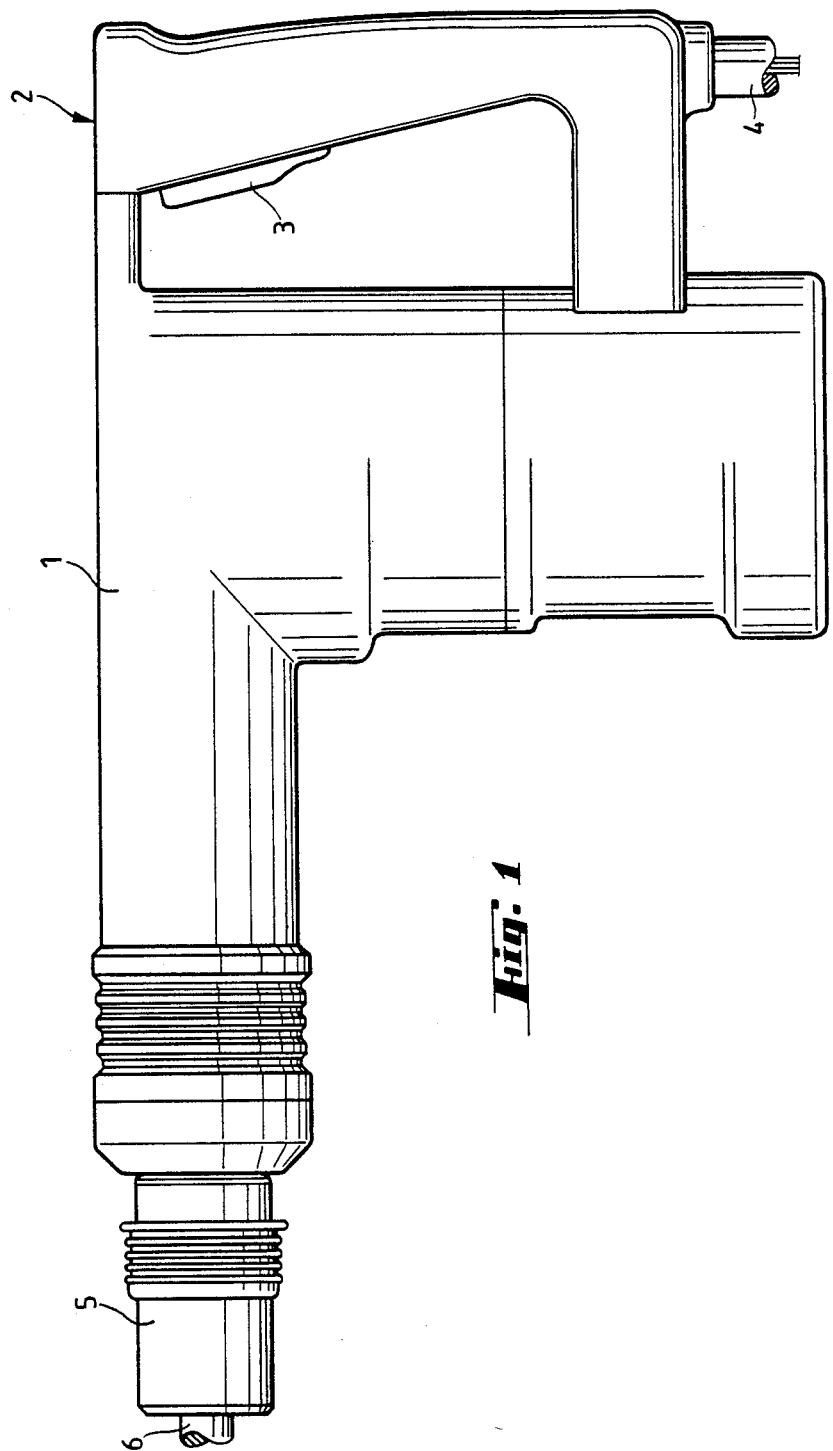
FIG. 1 is a side elevational view of a hand-held tool embodying the present invention.

In FIG. 1, a hand-held drill is illustrated, including a housing 1 with a handle 2 at its rear end. A trigger-like switch 3 is located in the handle 2 and an electric power line 4 is also connected to the handle. At the front end of the drill, the housing 1 supports a chuck 5, in which a working tool 6 shown only in part, such as a drill bit, is held so that the chuck and the working tool rotate relative to the housing.

Figure 2:
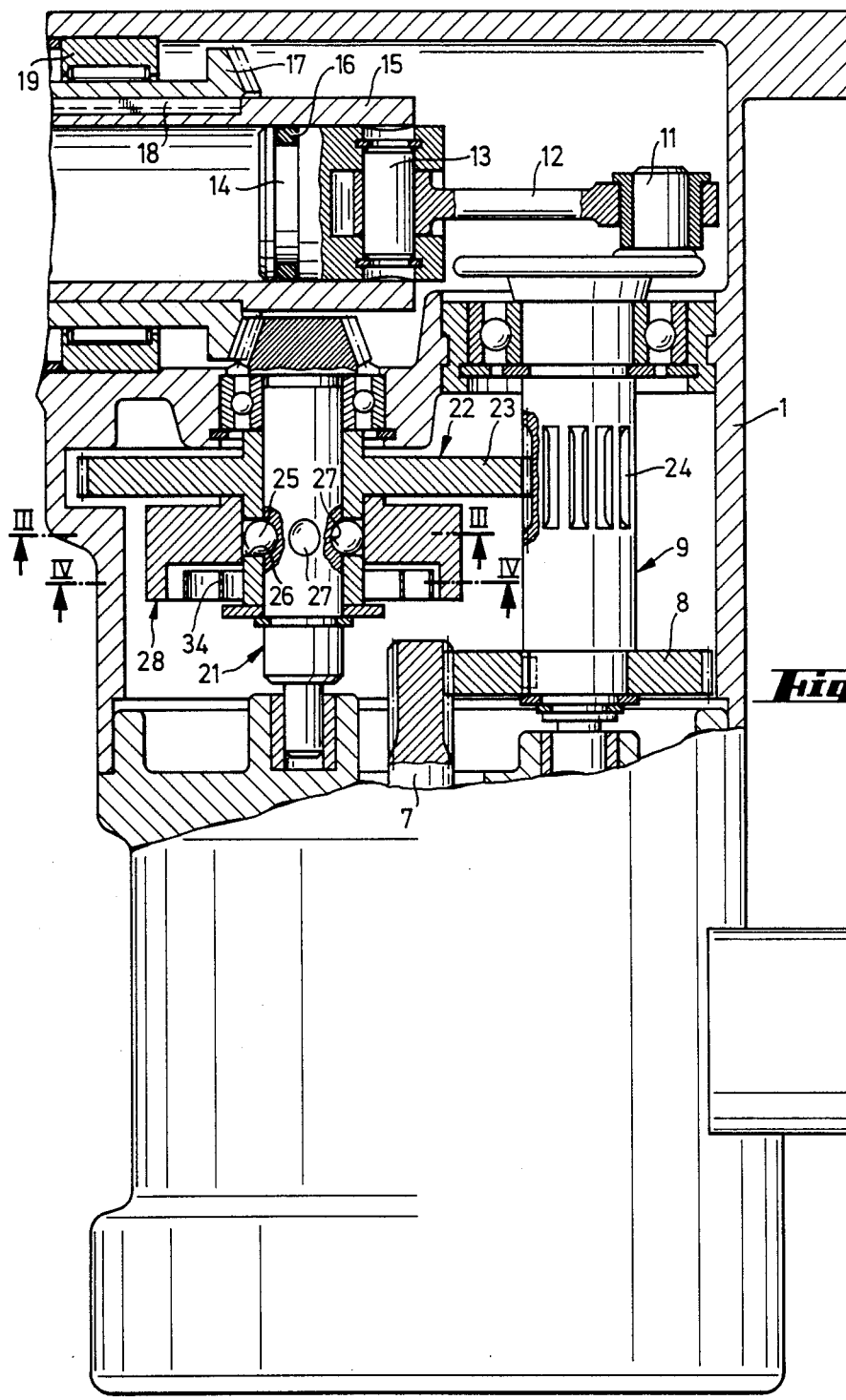
FIG. 2 is an enlarged partial sectional view of the drill shown in FIG. 1.

In FIG. 2, a section of the housing 1, adjacent the handle 2, is set forth. This portion of the housing 1 contains a gear unit, and a drive motor, not shown in detail. The drive motor has a drive pinion 7, note the lower portion of the section in FIG. 2. Drive pinion 7 is in meshed engagement with and drives a gear wheel 8 mounted on a shaft 9 so that the wheel 8 and the shaft 9 rotate together. At its upper end, shaft 9 has an eccentrically arranged crank pin 11. Crank pin 11 drives a connecting rod 12 which, in turn, is connected to a drive piston 14 by a bearing pin 13 so that the piston can be reciprocated. Drive piston 14 is guided for reciprocating movement in a guide cylinder 15. Guide cylinder 15 is rotatably supported and forms a part of a hammer drill device, known as such. To avoid any loss of air in the air cushion located ahead of the drive piston 14 in the guide cylinder 15, the drive piston carries a sealing ring 16 in sliding contact with the guide cylinder.

A beveled gear wheel 17 encircles and is connected to the outside of the guide cylinder 15 by means of a key 18 so that the gear wheel rotates the guide cylinder. The beveled gear wheel 17 is supported radially outwardly by a roller bearing 19. Accordingly, rotational movement, transmitted to the beveled gear wheel 17, is transmitted to the guide cylinder 15 and, in turn, to the working tool 6 in the chuck 5.

Figure 3:
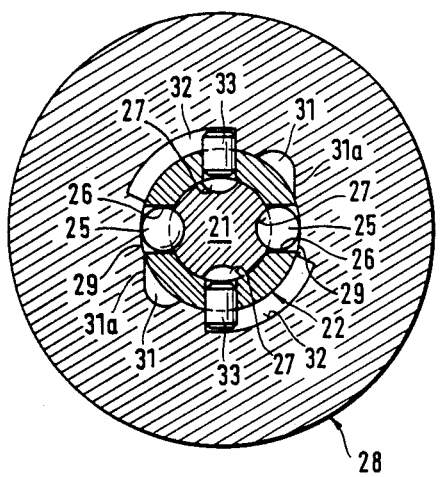
FIG. 3 is a sectional view taken along the line III—III in FIG. 2.

As viewed in FIG. 2, a power take-off spindle 21 is located below the guide cylinder 15 and is in meshed engagement with the beveled gear wheel 17. Power take-off spindle 21 is rotatably supported at two axially spaced locations in the housing 1. A part 22, on the drive side of the hand-held tool includes a gear wheel 23, in meshed engagement with a toothed section 24 of the shaft 9, and laterally encloses the take-off spindle 21 so that the part 22 can rotate the spindle. Coupling members 25 in the form of balls are mounted in a sleeve-like section of the part 22 and provide the transmission of rotational movement from the part 22 on the drive side to the power take-off spindle 21. Coupling members 25 are supported in through openings 26 in the sleeve-like portion of the part 22 so that the coupling members can be displaced radially relative to the axis of the power take-off spindle and extend into driving recesses 27 in the outer surface of the power take-off spindle 21. An annular inertial mass 28 extends around the part 22 on the drive side so that it can rotate relative to the part. As can be seen in FIG. 3, the annular inertial mass 28 holds the coupling members in the engaged position with the spindle 21 by means of support surfaces 29 on the inner surface of the mass 28. Preferably, a plurality of the coupling members 25 are used with corresponding driving recesses 27 arranged circumferentially spaced apart in the outer surface of the power take-off spindle 21.

Deflecting recesses 31 for receiving the coupling members 25 adjoin the support surfaces 29 in the inner surface of the inertial mass 28. Relative to the support surfaces 29, the deflecting recesses are located opposite to the driving direction of rotation of the spindle 21. On the side of the driving direction of rotation, the deflecting recesses 31 have an abutting flank 31a extending at an acute angle relative to the circumferential surface of the part 22 on the drive side, with the flank tapering inwardly from the recess 31 toward the outer surface of the part 22.

Figure 4:
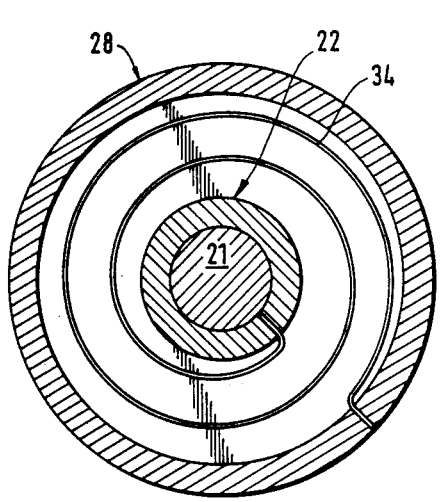
FIG. 4 is a simplified sectional view of the drill, taken along the line IV—IV in FIG. 2.

Inertial mass 28 has circumferentially extending grooves 32 in its inner surface. Pins 33, fixed to and extending radially outwardly from the part 22 on the drive side, extend into the grooves 32. As can be seen in FIG. 3, the pins 33 bear against one end of the grooves 32 in the driving direction of rotation. In combination with the grooves 32, the pins 33 form a driving means for the positive-locking rotational driving of the inertial mass 28 by the part 22 on the drive side. A spiral spring 34 secured at an inner end to the part 22 and at an outer end to the inertial mass 28, note FIG. 4, holds the pins 33 against the end of the grooves 32 in the driving direction of rotation, that is in the driving position as shown in FIG. 3.

Figure 3A:
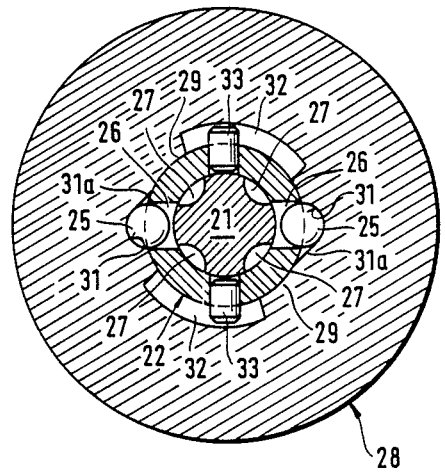
FIG. 3a is a sectional view similar to FIG. 3, illustrating another position of the drill.
Figure 4A:
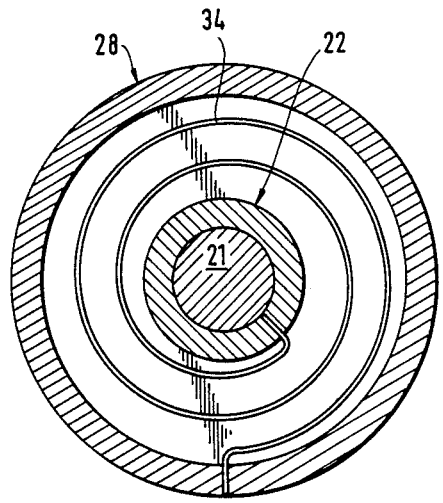

In operation, the hand-held tool rotates the working tool 6 with the rotational movement being transmitted from the drive motor via the drive pinion 7 to the gear wheel 8 through the shaft 9 to the part 22 and then via the coupling members 25 to the power take-off spindle 21 in meshed engagement with the bevel gear wheel 17 for rotating the guide cylinder 15. If the working tool 6 becomes seized in the receiving material, in which it is effecting the drilling operation, the above-mentioned parts, forming the rotational drive chain, are suddenly stopped. Due to the mass inertia or moment of inertia of the rotating inertial mass 28, the mass continues to run in the driving direction of rotation against the force of the spiral spring 34. Such rotation of the inertial mass 28 relative to the part 22 on the drive side, which is also stopped, causes the deflecting recesses 31 to move into alignment with and to receive the coupling members 25 immediately after the stoppage occurs. Torque, which continues to act on the part 22 on the drive side, from the drive motor, causes the coupling members to disengage from the driving recesses 27, where the coupling members move radially outwardly into the deflecting recesses 31, with the part 22 on the drive side continuing to rotate relative to the power take-off spindle held stationary due to the stoppage or seizure of the working tool 6. FIG. 3a shows the position of the coupling members 25 uncoupled from the driving recesses 27. In this position, the spiral spring 34 is tensioned more intensively, note FIG. 4a.

In the position displayed in FIG. 3a, coupling members 25 no longer engage the power take-off spindle 21 and the part 22 on the drive side continues to rotate, supported by the centrifugal force of the coupling members moving along with the part 22. Initially, the working tool 6 must be released from its stopped position in the receiving material, and the drive motor switched on again before the coupling members 25 can re-enter the driving recesses 27 during the starting rotational movement as the coupling members slide along the abutting flanks 31a. Inertial mass 28 carries out a rotational movement relative to the part 22 on the drive side opposite to the driving direction of rotation and such relative movement is supported by the spiral spring 34. Accordingly, the coupled driving position shown in FIGS. 2 and 3, is re-established. The angle of rotation of the inertial mass 28, relative to the part 22 on the drive side, between the two different rotational positions is approximately 45°.

While specific embodiments of the invention have been shown and described in detail to illustrate the application of the inventive principles, it will be understood that the invention may be embodied otherwise without departing from such principles.

We claim:

1. A safety clutch for a motor-driven hand tool comprising first means driven by a motor for driving a second means, said second means arranged for rotating a working tool held in the hand tool, said second means comprises a power take-off spindle (21) having an axis of rotation, a part (22) rotatably mounted on and encircling said spindle and in engagement with said first means whereby said first means drives said part, at least one displaceable coupling member (25) selectively coupling said part (22) to said spindle (21) so that said first means drives said spindle via said part, means for displacing said coupling member between a position connecting said part (22) to said spindle (21) so that said part can rotate said spindle and another position releasing the connection of said part and said spindle whereby said part can rotate relative to said spindle, said displacing means comprises an annular inertial mass (28) rotatably mounted on said part (22) between a first position where said coupling member connects said part and said spindle and a second position where said part is released from said spindle, said mass (28) has a radially inner surface facing said part (22) and said inner surface includes at least one support surface (29) for holding said coupling member (25) in the first position of said inertial mass and a deflecting recess (31) spaced circumferentially from said support surface for receiving said coupling member in the second position of said inertial mass.

2. A safety clutch, as set forth in claim 1, wherein said support surface (29) on said inertial mass (28) is located ahead of said deflecting recess in the driving direction of rotation of said part (22).

3. A safety clutch, as set forth in claim 2, wherein engagement means (32, 33) for permitting angular movement of said inertial mass (28) relative to said part (22) is located on said part (22) and on the inertial mass (28).

4. A safety clutch, as set forth in claim 3, wherein said engagement means comprises a pin (33) secured to and extending radially outwardly from said part (22) and a circumferentially extending groove (32) in the inner surface of said inertial mass (28) with said pin projecting into said groove.

5. A safety clutch, as set forth in claim 4, wherein said pin (33) and said groove (32) permit angular movement of said inertial mass (28) relative to said part (22) in the range of 20° to 60°.

6. A safety clutch, as set forth in claim 1, wherein a spring is secured to said part (22) and to said inertial mass (28) and said spring biases said inertial mass relative to said part toward the first position where said part is connected with said spindle via the coupling member.

7. A safety clutch, as set forth in claim 1, comprising a circumferentially extending transition section extending between said deflecting recess (31) and said support surface (29) with said transition section comprising an abutting flank 31a arranged at an acute angle relative to an adjacent circumferential surface of said part (22) with said flank tapering inwardly from said deflecting recess to said adjacent surface.

8. A safety clutch, as set forth in claim 7, wherein a pair of said coupling members (25) mounted in through openings in said part (22) and each engageable with a separate driving recess (27) in said spindle (21) and a separate said deflecting recess (31) in said inertial mass.

* * * * *